US008712375B2

(12) United States Patent
Lovell, Jr.

(10) Patent No.: US 8,712,375 B2
(45) Date of Patent: Apr. 29, 2014

(54) SYSTEM AND METHOD FOR ENHANCED TRANSACTION PAYMENT

(75) Inventor: Robert C. Lovell, Jr., Leesburg, VA (US)

(73) Assignee: Sybase 365, Inc., Dublin, CA (US)

( * ) Notice: Subject to any disclaimer, the term of this patent is extended or adjusted under 35 U.S.C. 154(b) by 1122 days.

(21) Appl. No.: 12/017,145

(22) Filed: Jan. 21, 2008

(65) Prior Publication Data

US 2008/0182551 A1  Jul. 31, 2008

Related U.S. Application Data

(60) Provisional application No. 60/897,843, filed on Jan. 29, 2007.

(51) Int. Cl.
*H04M 11/00* (2006.01)

(52) U.S. Cl.
USPC ............... 455/407; 455/406; 705/17; 705/40; 705/53

(58) Field of Classification Search
USPC ............. 455/408–408, 414.3, 466, 406, 407; 705/40, 17, 79, 77, 53, 44
See application file for complete search history.

(56) References Cited

U.S. PATENT DOCUMENTS

| | | | |
|---|---|---|---|
| 6,868,391 B1 * | 3/2005 | Hultgren | 705/17 |
| 2003/0119478 A1 * | 6/2003 | Nagy et al. | 455/408 |
| 2005/0107067 A1 * | 5/2005 | Redecker | 455/407 |
| 2006/0025110 A1 * | 2/2006 | Liu | 455/411 |
| 2006/0253339 A1 * | 11/2006 | Singh et al. | 705/26 |
| 2007/0244811 A1 * | 10/2007 | Tumminaro | 705/39 |
| 2008/0227391 A1 * | 9/2008 | Rosenberg | 455/41.1 |

* cited by examiner

*Primary Examiner* — Marcos Torres
(74) *Attorney, Agent, or Firm* — Kenyon & Kenyon LLP

(57) ABSTRACT

An infrastructure that leverages established wireless messaging paradigms (such as, possibly inter alia, Short Message Service, Multimedia Message Service, Wireless Application Protocol, IP Multimedia Subsystem, etc.) to provide, in new and creative ways, an enhanced level of security for the payment element or portion of a transaction—for example, a transaction within Mobile Commerce (M-Commerce, which, broadly speaking, encompasses the buying and selling of merchant-supplied products, goods, and services through wireless devices), a purchase in the checkout lane of a brick-and-mortar store, a purchase at a (fast-food or other) restaurant, etc. The infrastructure may optionally leverage the capabilities of a centrally-located Messaging Inter-Carrier Vendor.

20 Claims, 5 Drawing Sheets

SYSTEM AND METHOD FOR ENHANCED TRANSACTION PAYMENT

This application claims the benefit of U.S. Provisional Patent Application No. 60/897,843, filed on Jan. 29, 2007, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS), Internet Protocol (IP) Multimedia Subsystem (IMS), Wireless Application Protocol (WAP), etc.

2. Background of the Invention

As the 'wireless revolution' continues to march forward the importance to a Mobile Subscriber (MS), for example a user of a Wireless Device (WD)—for example a user of a Wireless Device (WD) such as, inter alia, a mobile telephone, a BlackBerry, etc. that is serviced by a Wireless Carrier (WC)—of their WD grows substantially.

One consequence of such a growing importance is the resulting ubiquitous nature of WDs—i.e., MSs carry them at almost all times and use them for an ever-increasing range of activities.

Within the universe of ever-increasing activities, one of the specific activities for which MSs would like to employ their WDs encompasses the facilitation, completion, etc. of the payment element of a transaction, purchase, etc.—for example, a transaction within Mobile Commerce (M-Commerce, which, broadly speaking, encompasses the buying and selling of merchant-supplied products, goods, and services through WDs), a purchase in the checkout lane of a brick-and-mortar store, a purchase at a (fast-food or other) restaurant, etc.

Consequently the need exists for an infrastructure that allows MSs, through their WDs, to seamlessly participate in, support, facilitate, complete, etc., in new and creative ways, payments for transactions across the diverse range of transaction types (including, among other things, transactions that involve very small amounts of money all the way up to transactions that involve very large amounts of money).

The present invention provides such enhanced transaction payment capabilities and addresses, in new and innovatory ways, various of the (not insubstantial) challenges that are associated with same.

SUMMARY OF THE INVENTION

In one embodiment of the present invention there is provided a method for enhancing the security of a transaction payment in which a request message is received from a mobile subscriber, where the request message is associated with a payment portion of a transaction and includes a payment amount.

The amount of the transaction is extracted and, based thereon, as well as based on information previously supplied by the mobile subscriber, an authorization code is generated. The authorization code is then packaged in a response message and dispatched to the mobile subscriber The request message (and the response message) may be any one of (a) a Short Message Service message, (b) a Multimedia Message Service message, and/or (c) an IP Multimedia Subsystem message, and may further include one or more of (a) an account identifiers and/or (b) a password.

In accordance with one feature of the present invention, the initial request may also initiate one or more of (a) one or more inquiries to the mobile subscriber, (b) a low or an empty balance replenishment operation, and/or (c) mobile subscriber location awareness. The mobile subscriber location awareness may be derived from, e.g., one or more of (a) Location-Based Services and/or (b) Global Positioning System.

In accordance with another feature of the present invention, the information that is previously supplied by the mobile subscriber is provided during a registration process, which may be web-based In accordance with an aspect of the present invention, when the mobile subscriber receives the authorization code, he/she may then supply the code to a merchant with whom the mobile subscriber is transacting. The authorization code may so supplied via one or more of (a) manual means, (b) Bluetooth, (c) WiFi, (d) Near Field Communication, (e) Uniform Resource Locator, and/or (f) Web cookie.

In still another aspect of the present invention, an approval code is generated, perhaps by request of the merchant, and returned to the merchant, who may, in turn, pass the approval code to the mobile subscriber.

In accordance with another embodiment of the present invention, there is provided a method of conducting a commercial transaction including the steps of receiving a single, mobile subscriber-initiated, short message service (SMS) message, the SMS message including a payment amount for a commercial transaction, communicating with a billing interface to obtain an authorization code for the payment amount, sending a response SMS message to the mobile subscriber, the response SMS message including the authorization code, receiving the authorization code from a party to the commercial transaction other than the mobile subscriber (e.g., a merchant), and generating an approval code based on the authorization code, payment amount and at least one identifier, and supplying the approval code to the party to the commercial transaction other than the mobile subscriber (again, e.g., the merchant).

In this embodiment, the approval code may then be received from the mobile subscriber in an SMS message. In connection with supplying the approval code to the mobile subscriber, it may be desirable also to confirm at that time that the mobile subscriber is in a same location as the merchant. In this way, both the merchant and the mobile subscriber are confident that the commercial transaction is not fraudulent.

These and other features of the embodiments of the present invention, along with their attendant advantages, will be more fully appreciated upon a reading of the following detailed description in conjunction with the associated drawings.

It should be understood that these figures depict embodiments of the invention. Variations of these embodiments will be apparent to persons skilled in the relevant art(s) based on the teachings contained herein.

DETAILED DESCRIPTION

The present invention may leverage the capabilities of a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same. The disclosure of U.S. Pat. No. 7,154,901, along with its associated continuations, is incorporated herein by reference.

Figure 1:
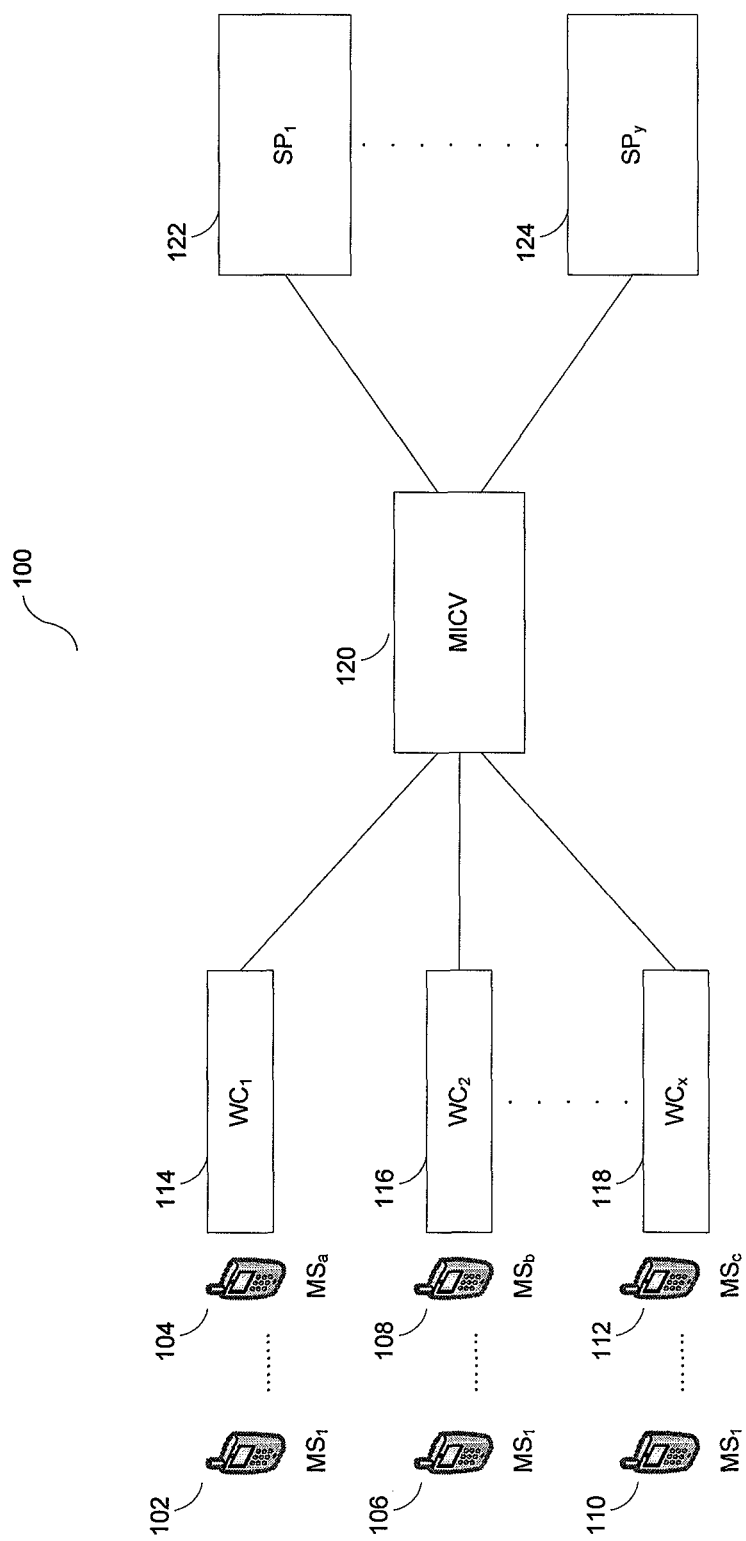
FIG. 1 is a diagrammatic presentation of an exemplary Messaging Inter-Carrier Vendor (MICV).

As illustrated in FIG. 1 and reference numeral 100 a MICV 120 is disposed between, possibly inter alia, multiple WCs (WC$_1$ 114→WC$_x$ 118) on one side and multiple SPs (SP$_1$ 122→SP$_y$ 124) on the other side and thus 'bridges' all of the connected entities. A MICV 120 thus, as one simple example, may offer various routing, formatting, delivery, value-add, etc. capabilities that provide, possibly inter alia:

1) A WC 114→118 (and, by extension, all of the MSs 102→104/106→108/110→112 that are serviced by the WC 114→118) with ubiquitous access to a broad universe of SPs 122→124, and 2) A SP 122→124 with ubiquitous access to a broad universe of WCs 114→118 (and, by extension, to all of the MSs 102→104/106→108/110→112 that are serviced by the WCs 114→118).

A MICV 120 may have varying degrees of visibility (e.g., access, etc.) to the (MS←→MS, MS←→SP, etc.) messaging traffic:

1) A WC 114→118 may elect to route just their out-of-network messaging traffic to a MICV 120. Under this approach the MICV 120 would have visibility (e.g., access, etc.) to just the portion of the WC's 114→118 messaging traffic that was directed to the MICV 120 by the WC 114→118.

2) A WC 114→118 may elect to route all of their messaging traffic to a MICV 120. The MICV 120 may, possibly among other things, subsequently return to the WC 114→118 that portion of the messaging traffic that belongs to (i.e., that is destined for a MS 102→104/106→108/110→112 of) the WC 114→118. Under this approach the MICV 120 would have visibility (e.g., access, etc.) to all of the WC's 114→118 messaging traffic.

While the discussion below will include a MICV it will be readily apparent to one of ordinary skill in the relevant art that other arrangements are equally applicable and indeed are fully within the scope of the present invention.

In the discussion below the present invention is described and illustrated as being offered by a SP. A SP may, possibly inter alia, be realized as a third-party (e.g., a service bureau), an element of a WC or a landline carrier, an element of a MICV, multiple entities working together, etc.

To help explain key aspects of the present invention consider the illustrative example that is depicted through FIG. 2 and the supporting narrative below.

Figure 2:
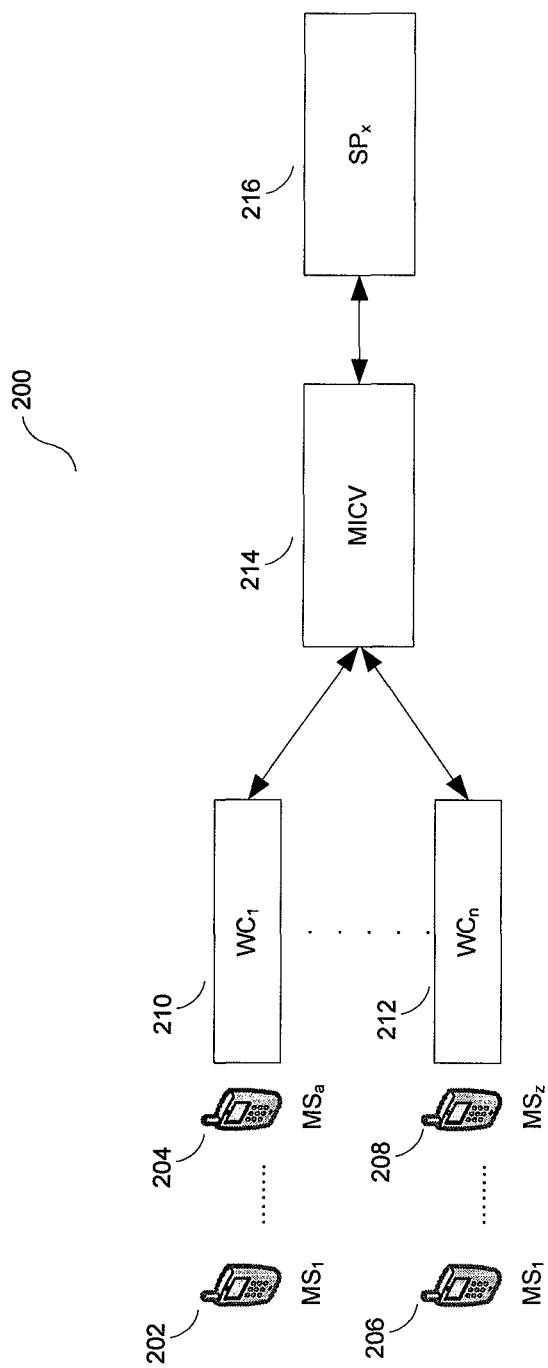
FIG. 2 illustrates one particular arrangement that is possible through aspects of the present invention.

As indicated in FIG. 2 and reference numeral 200 the (SMS/MMS/etc.) messaging traffic of numerous WCs (WC$_1$ 210→WC$_n$ 212) is exchanged with a MICV 214 and the MICV 214 is connected with SP$_x$ 216, a SP that offers, possibly inter alia, the present invention.

Within the framework that is illustrated by FIG. 2 SP$_x$ 216 may offer a registration process. During such a process a MS that is interested in using aspects of the present invention may identify herself and provide some range of information. A registration process may be tailored (e.g., the range of information gathered, the scope of access subsequently granted, etc.) to the class of user—e.g., different types, categories, etc. of MSs may complete different registration processes.

Figure 3:
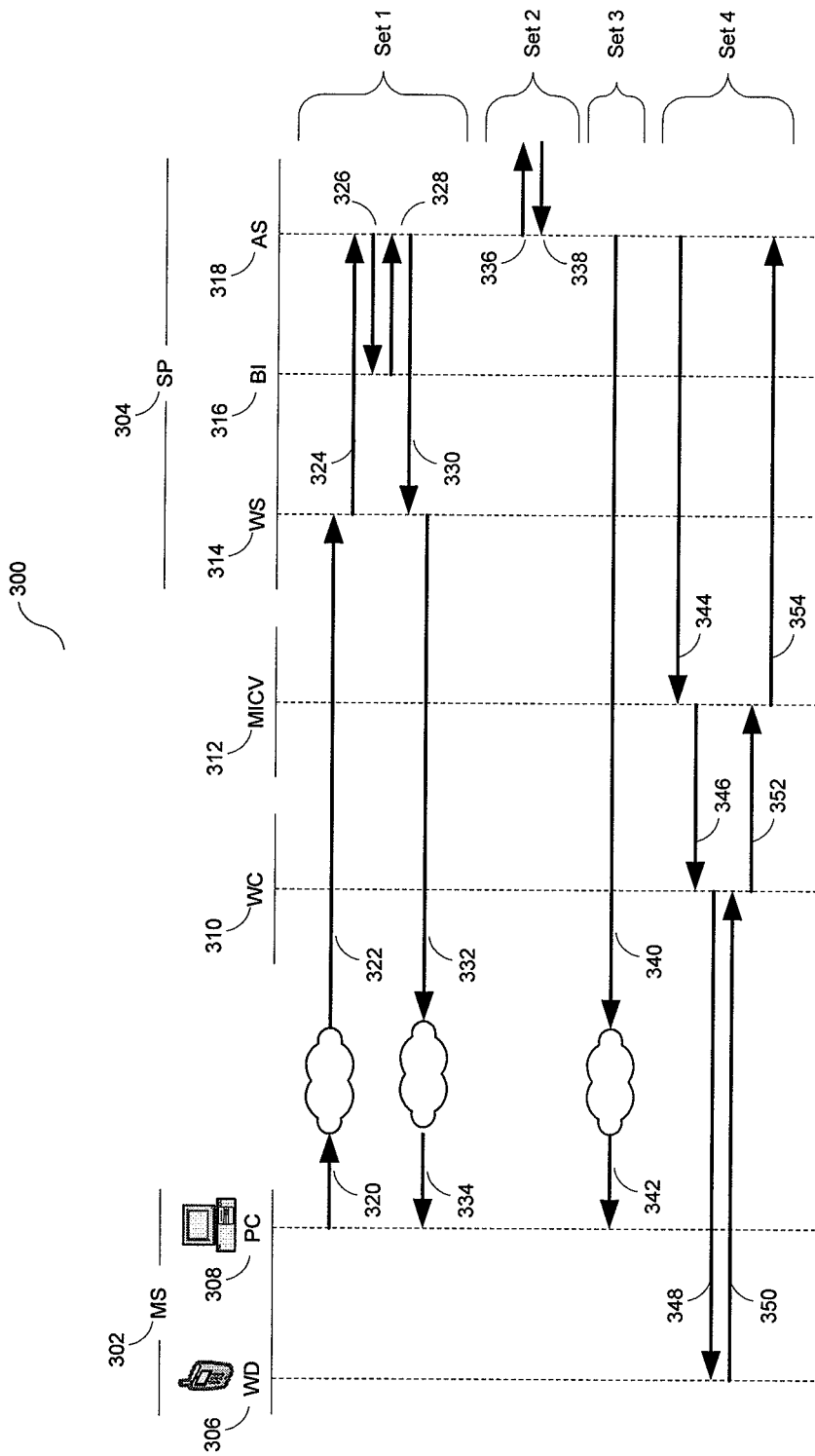
FIG. 3 illustrates various of the exchanges or interactions that are possible during the registration portion of the present invention.

FIG. 3 and reference numeral 300 illustrate various of the exchanges or interactions that might occur during an illustrative registration process (involving a hypothetical MS, Mary 302, and our hypothetical SP, SP$_x$ 304). Of interest and note in the diagram are the following entities:

MS 302 WD 306. For example, Mary's WD such as a cellular telephone, BlackBerry, PalmPilot, etc.

MS 302 Personal Computer (PC) 308. For example, one of Mary's work, home, etc. PCs.

WC 310. The provider of service for Mary's WD.

MICV 312. As noted above the use of a MICV, although not required, provides significant advantages.

SP 304 Web Server (WS) 314. A publicly-available World Wide Web (WWW) site that is optionally provided by SP$_x$.

SP 304 Billing Interface (BI) 316. A single, consolidated interface that SP$_x$ may use to easily reach, inter alia, one or more external entities such as a credit card or debit card clearinghouse, a carrier billing system, a service bureau that provides access to multiple carrier billing systems, etc.

SP 304 AS 318. Facilities that provide key elements of the instant invention (which will be further described below).

It is important to note that while in FIG. 3 the MS 302 WD 306 and MS 302 PC 308 entities are illustrated as being adjacent or otherwise near each other in actual practice the entities may, for example, be physically located anywhere.

It is also important to note that in the discussion to follow reference is made to messages that are sent, for example, between a MS 302 and an SP 304. As set forth below, a given "message" sent between a MS 302 and a SP 304 may actually comprise a series of steps in which the message is received, forwarded and routed between different entities, including a WD 306 associated with a MS 302, a WC 310, a MICV 312, and a SP 304. Thus, unless otherwise indicated, it will be understood that reference to a particular message generally includes that particular message as conveyed at any stage between an origination source, such as a WD 306 of a MS 302, and an end receiver, such as a SP 304. As such, reference to a particular message generally includes a series of related communications between, for example, a MS 302 and a WC 310, the WC 310 and a MICV 312, and the MICV 312 and a SP 304. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

In FIG. 3 the exchanges that are collected under the designation Set 1 represent the activities that might take place as Mary 302 begins a registration process with SP$_x$ 304. For example:

A) Mary 302 uses one of her PCs 308 to visit a WS 314 of SP$_x$ 304 to, possibly among other things, complete a service registration process (see 320→322).

B) SP$_x$'s 304 WS 314 interacts with SP$_x$'s 304 AS 318 to, possibly among other things, commit some or all of the information that Mary 302 provided to a data repository (e.g., a database), optionally complete a billing transaction, etc. (see 324).

C) As appropriate and as required a BI 316 completes a billing transaction (see 326→328).

D) $SP_x$'s 304 WS 314 responds appropriately (e.g., with the presentation of a confirmation message, etc.) (see 332→334).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, the collected information may be reviewed, confirmed, etc. through one or more manual and/or automatic mechanisms. For example, the registration process may be completed through any combination of one or more channels including, inter alia, the indicated WWW facility, wireless messaging (SMS, MMS, IMS, etc.), E-mail messages, Instant Messaging (IM) exchanges, conventional mail, telephone, Interactive Voice Response (IVR) facilities, etc.

During the registration process that was described above a range of information may be captured from a candidate user including, inter alia:

1) Identifying Information (e.g., general information about Mary). For example, possibly among other things, a unique identifier and a password, optionally a pseudonym or handle, name, age, sex, etc.

2) Contact Information. For example, possibly among other things, contact information (such as, possibly inter alia, landline and/or wireless Telephone Numbers [TNs], E-mail addresses, IM addresses, physical addresses, etc.).

3) Billing Information. Different service billing models may be offered by $SP_x$ including, possibly inter alia, free (e.g., possibly advertising-based), a fixed one-time charge, a recurring (e.g., per transaction, etc.) fixed charge, a recurring (e.g., per transaction, etc.) variable charge, etc. Different payment mechanisms may be supported by $SP_x$ including, possibly among other things, credit or debit card information, authorization to place a charge on a MS's phone bill, etc.

4) Account Information. For example, possibly among other things, the particulars for one or more (internal to $SP_x$) accounts. The particulars might include, possibly inter alia, an account identifier, account spending/funding/etc. limits or thresholds, one or more funding sources (e.g., cash, one or more of the mechanisms that were identified in the above Billing Information, etc.), the particulars (including, possibly inter alia, timing, dollar amount, source[s], etc.) for periodic scheduled account replenishment or 'top up' actions, the particulars (including, possibly inter alia, occurrence frequency, size or dollar amount, etc.) for when additional or extra approval steps should be applied, etc.

5) Other Information. Additional, possibly optional, information.

The specific pieces of information that were described above are illustrative only and it will be readily apparent to one of ordinary skill in the relevant art that numerous other pieces of information (e.g., scheduled per-transaction or daily/weekly/etc. reporting that may be desired, etc.) are easily possible and indeed are fully within the scope of the present invention.

As noted above the information that Mary provided during the registration process may be preserved in a data repository (e.g., a database) and may optionally be organized as a MS Profile.

The content of Mary's profile may optionally be augmented by $SP_x$. For example, one or more internal or external sources of consumer, demographic, geographic, psychographic, corporate, etc. information may be leveraged to selectively enhance or augment elements of Mary's profile.

As noted above, a SP's BI may optionally complete one or more billing transactions. A billing transaction may take any number of forms and may involve different external entities (e.g., a WC's billing system, a carrier billing system service bureau, a credit or debit card clearinghouse, etc.). A billing transaction may include, inter alia:

1) The placement of a line item charge on the bill or statement that a MS receives from her WC. Exemplary mechanics and logistics associated with this approach are described in, for example, pending U.S. patent application Ser. No. 10/837,695 entitled "SYSTEM AND METHOD FOR BILLING AUGMENTATION." Other ways of completing or performing line item billing are easily implemented by those skilled in the art.

2) The charging of a credit card, the debiting of a debit card, etc.

3) The (electronic, etc.) transfer of funds.

4) The generation of an invoice, statement, etc.

In FIG. 3 the exchanges that are collected under the designation Set 2 represent the activities that might take place as $SP_x$ 304 optionally coordinates, etc. with one or more external entities (such as, for example, one or more credit card clearinghouses, etc.) to, possibly among other things, secure access, arrange for funds, etc. (see 336→338).

The specific exchanges that were described above (as residing under the designation Set 2) are illustrative only and it will be readily apparent to one of ordinary skill in the relevant art that numerous other exchanges (including, inter alia, updates to various of the information in a MS Profile in a SP's repository, etc.) are easily possible and indeed are fully within the scope of the present invention.

In FIG. 3 the exchanges that are collected under the designation Set 3 represent the activities that might take place as $SP_x$ 304 dispatches to Mary 302 one or more confirmation E-mail messages (see 340→342).

The specific exchanges that were described above (as residing under the designation Set 3) are illustrative only and it will be readily apparent to one of ordinary skill in the relevant art that numerous other exchanges (including, inter alia, other types or forms of confirmation messages) are easily possible and indeed are fully within the scope of the present invention.

In FIG. 3 the exchanges that are collected under the designation Set 4 represent the activities that might take place as $SP_x$'s 304 AS 318 dispatches one or more confirmation SMS, MMS, IMS, etc. messages to Mary's 302 WD 306 (see 344→348) and Mary 302 replies or responds to the message (s) (see 350→354). In the instant example the messages are shown traversing a MICV 312. $SP_x$ 304 may employ a Short Code (SC) or a regular TN as its source address (and to which it would ask users of its service to direct any reply messages). While the abbreviated length of a SC (e.g., five digits for a SC administered by Neustar under the Common Short Code [CSC] program) incrementally enhances the experience of a MS 302 (e.g., the MS 302 need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "UNIVERSAL SHORT CODE ADMINISTRATION FACILITY."

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention.

The registration information that was described above may subsequently be managed (e.g., existing information may be edited or removed, new information may be added, etc.) through any combination of one or more channels including, inter alia, a SP's WWW facility, wireless messaging (SMS, MMS, IMS, etc.), e-mail messages, IM exchanges, conventional mail, telephone, IVR facilities, etc.

To continue with the explanation of key aspects of the present invention . . . consider one possible use or incarnation of aspects of the present invention. In this simple illustrative use Mary, our hypothetical MS, completes a registration process (e.g., as described above), subsequently enters a store, completes her shopping in the store, and then enters a checkout lane where her purchases are rung.

The simple scenario that was just described is illustrative only and it will be readily apparent to one of ordinary skill in the art that numerous other alternative scenarios are easily possibly and indeed are fully within the scope of the present invention. For example, possibly inter alia:

1) Mary may complete a purchase within an M-Commerce environment.

2) Mary may order a meal at a (fast-food or other) restaurant.

3) Mary may purchase a ticket at a theater ticket window.

4) Mary may secure services for her automobile at a gas or filling station, at a repair or service facility, etc.

Figure 4:
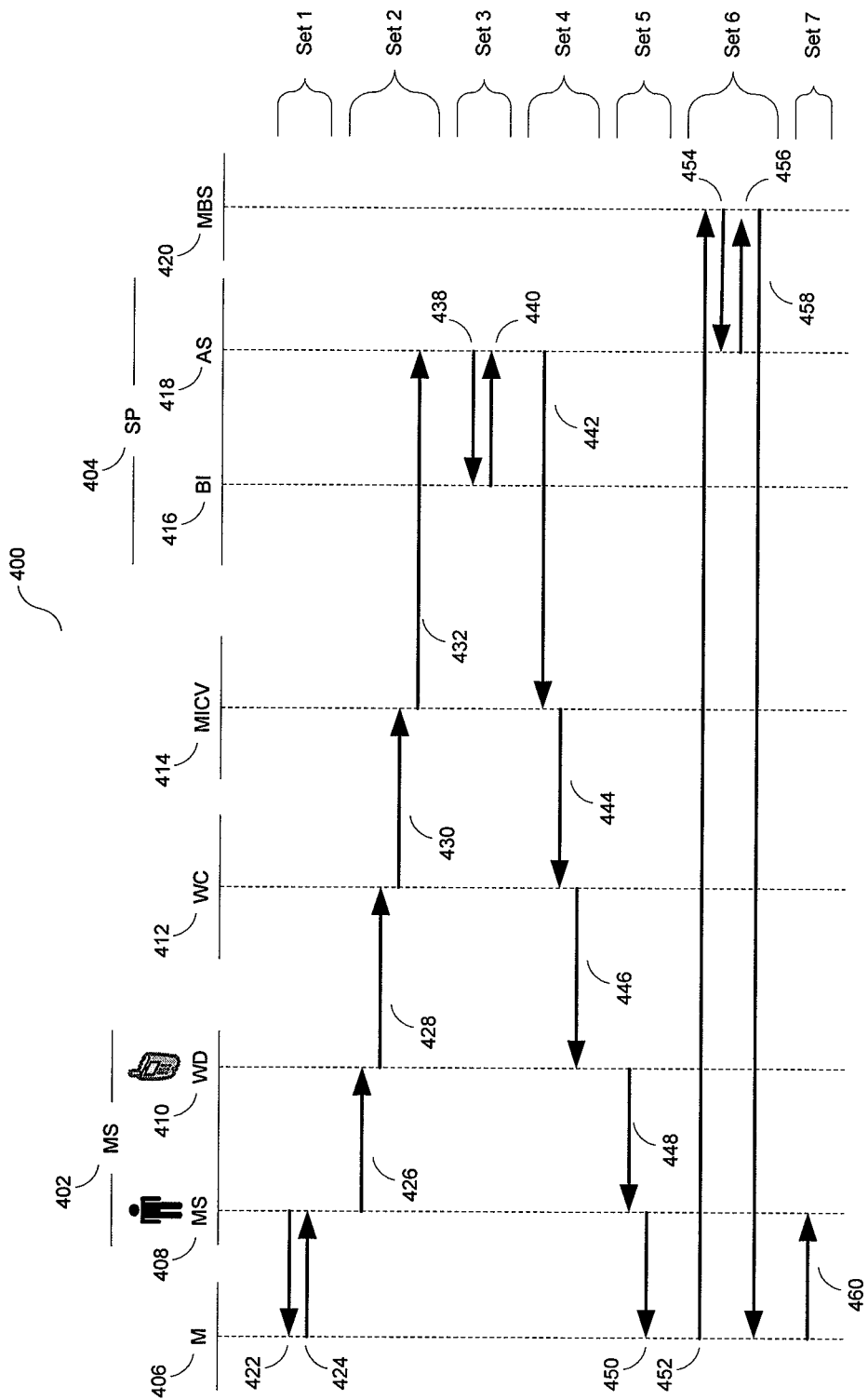
FIG. 4 illustrates various of the exchanges or interactions that are supported by aspects of the present invention.

The simple scenario that was described above (i.e., Mary completes a registration process, subsequently enters a store, completes her shopping, and enters a checkout lane where her purchases are rung) may be examined further through the illustrative interactions that are depicted in FIG. 4 and reference numeral 400. Of interest and note are the following entities:

Merchant (M) 406. For example, the store that Mary is visiting.

MS 402 MS 408. For example, Mary herself.

MS 402 WD 410. For example, Mary's WD such as a cellular telephone, BlackBerry, PalmPilot, etc.

WC 412. The provider of service for Mary's WD.

MICV 414. As noted above the use of a MICV, although not required, provides significant advantages.

SP 404 BI 416. As noted above, a single, consolidated interface that a SP may use to easily reach, inter alia, one or more external entities (such as, for example, a credit card or debit card clearinghouse, a carrier billing system, a service bureau that provides access to multiple carrier billing systems, etc.).

SP 404 AS 418. Facilities that provide key elements of the instant invention (which will be described below).

M Back-end System (MBS) 420. For example, one or more back-end billing, inventory, Point of Sale (PoS), etc. system(s).

In the discussion to follow reference is made to messages that are sent, for example, between a MS 402 and an SP 404. As set forth below, a given "message" sent between a MS 402 and a SP 404 may actually comprise a series of steps in which the message is received, forwarded and routed between different entities, including a WD 410 associated with a MS 402, a WC 412, a MICV 414, and a SP 404. Thus, unless otherwise indicated, it will be understood that reference to a particular message generally includes that particular message as conveyed at any stage between an origination source, such as a WD 410 of a MS 402, and an end receiver, such as a SP 404. As such, reference to a particular message generally includes a series of related communications between, for example, a MS 402 and a WC 412, the WC 412 and a MICV 414, and the MICV 414 and a SP 404. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

In FIG. 4 the exchanges that are collected under the designation Set 1 represent the activities that might take place as Mary 408, while in the checkout lane, receives from M 406, possibly inter alia, the dollar amount of her purchase (see 422→424). The information may be conveyed to Mary 408 manually (e.g., verbally, through a messaging exchange, etc.) and/or automatically (e.g., via Bluetooth, via WiFi, etc.).

It is important to note the Set 1 exchanges that were described above are illustrative only and it will be readily apparent to one of ordinary skill in the relevant art that numerous other exchanges are easily possible (e.g., in an M-Commerce environment information may be conveyed through, possibly inter alia, cookies, Uniform Resource Locators [URLs], etc.) and indeed are fully within the scope of the present invention.

In FIG. 4 the exchanges that are collected under the designation Set 2 represent the activities that might take place as Mary 408 users her WD 410 (see 426) to compose and dispatch a (SMS, MMS, etc.) request message (see 428); the message 428 is routed by Mary's 408 WC 412 to a MICV 414 (see 430) and then directed, by the MICV 414, to $SP_x$ 404 (see 432); and the message is received and processed by $SP_x$ 404 (specifically, by an AS 418 of $SP_x$ 404).

To provide context for the next portion of our example we take a brief detour and describe an illustrative SP AS.

Figure 5:
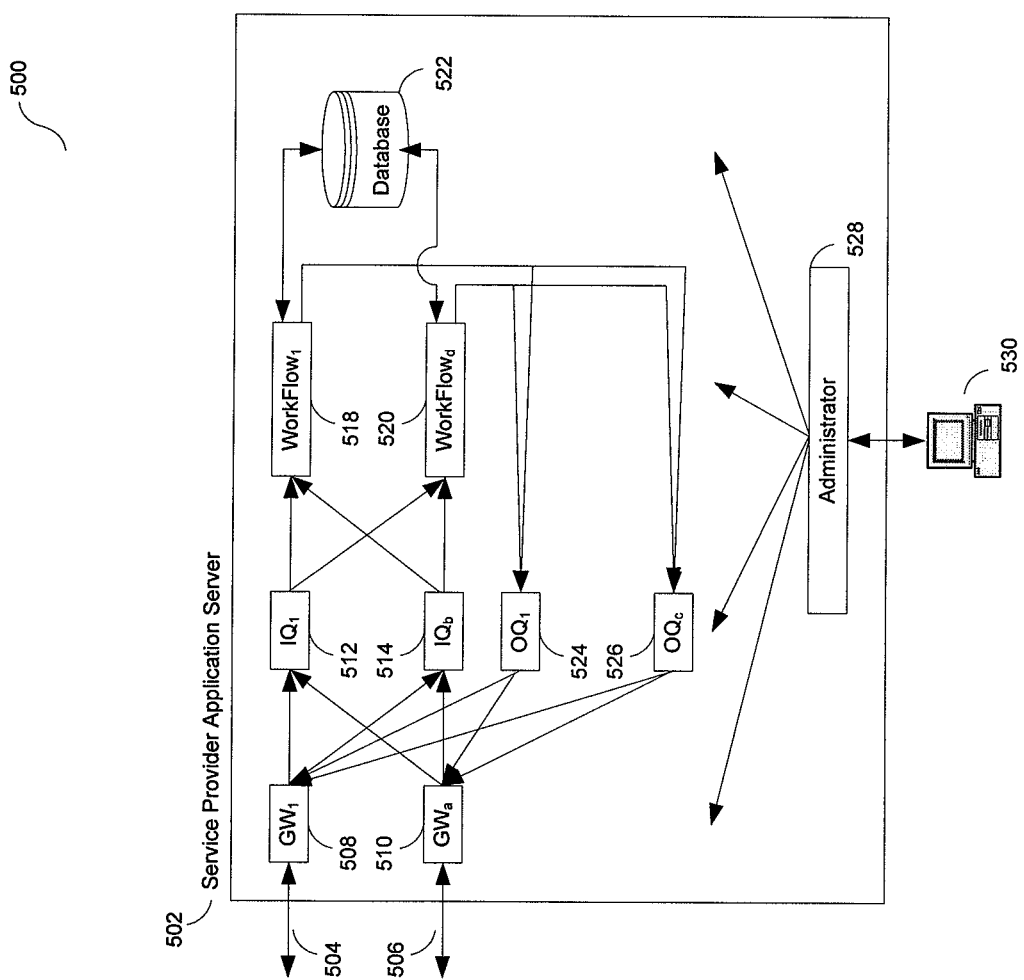
FIG. 5 is a diagrammatic presentation of aspects of an exemplary Service Provider (SP) Application Server (AS).

FIG. 5 and reference numeral 500 provide a diagrammatic presentation of aspects of an exemplary SP AS 502. The illustrated AS contains several key components—Gateways ($GW_1$ 508→$GW_a$ 510 in the diagram), Incoming Queues ($IQ_1$ 512→$IQ_b$ 514 in the diagram), WorkFlows ($WorkFlow_1$ 518→$WorkFlow_d$ 520 in the diagram), Database 522, Outgoing Queues ($OQ_1$ 524→$OQ_c$ 526 in the diagram), and an Administrator 528. It will be readily apparent to one of ordinary skill in the relevant art that numerous other components are possible within an AS 502.

A dynamically updateable set of one or more Gateways ($GW_1$ 508→$GW_a$ 510 in the diagram) handle incoming (SMS/MMS/IMS/etc. messaging, etc.) traffic 504→506 and outgoing (SMS/MMS/IMS/etc. messaging, etc.) traffic 504→506. Incoming traffic 504→506 is accepted and deposited on an intermediate or temporary Incoming Queue ($IQ_1$ 512→$IQ_b$ 514 in the diagram) for subsequent processing. Processed artifacts are removed from an intermediate or temporary Outgoing Queue ($OQ_1$ 524→$OQ_c$ 526 in the diagram) and then dispatched 504→506.

A dynamically updateable set of one or more Incoming Queues ($IQ_1$ 512→$IQ_b$ 514 in the diagram) and a dynamically updateable set of one or more Outgoing Queues ($OQ_1$ 524→$OQ_c$ 526 in the diagram) operate as intermediate or temporary buffers for incoming and outgoing traffic 504→506.

A dynamically updateable set of one or more WorkFlows (WorkFlow$_1$ 518→WorkFlow$_d$ 520 in the diagram) remove incoming traffic from an intermediate or temporary Incoming Queue (IQ$_1$ 512→IQ$_b$ 514 in the diagram), perform all of the required processing operations (explained below), and deposit processed artifacts on an intermediate or temporary Outgoing Queue (OQ$_1$ 524→OQ$_c$ 526 in the diagram). The WorkFlow component will be described more fully below.

The Database 522 that is depicted in FIG. 5 is a logical representation of the possibly multiple physical repositories that may be implemented to support, inter alia, configuration, word catalog, calculation, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

An Administrator 528 provides management or administrative control over all of the different components of an AS through, as one example, a Web-based interface. It will be readily apparent to one of ordinary skill in the relevant art that numerous other interfaces (e.g., an Application Programming Interface [API], a data feed, etc.) are easily possible.

Through flexible, extensible, and dynamically updatable configuration information a WorkFlow component may be quickly and easily realized to support any number of activities. For example, WorkFlows might be configured to support a registration process; to support the receipt and processing of incoming (SMS, MMS, IMS, etc.) messages; to support the generation and processing of billing events; to support the generation and dispatch of outgoing confirmation, update, etc. messages; to support the generation of scheduled and/or on-demand reports; etc. The specific WorkFlows that were just described are exemplary only; it will be readily apparent to one of ordinary skill in the relevant art that numerous other WorkFlow arrangements, alternatives, etc. are easily possible.

A SP may maintain a repository (e.g., a database) into which selected details of all administrative, messaging, processing, etc. activities may be recorded. Among other things, such a repository may be used to support:

1) Scheduled (e.g., daily, weekly, etc.) and/or on-demand reporting with report results delivered through SMS, MMS, IMS, etc. messages; through E-mail; through a WWW-based facility; through IM; through an IVR facility; etc.

2) Scheduled and/or on-demand data mining initiatives (possibly leveraging or otherwise incorporating one or more external data sources) with the results of same presented through visualization, Geographic Information System (GIS), etc. facilities and delivered through SMS, MMS, IMS, etc. messages; through E-mail; through a WWW-based facility; trough IM; through an IVR facility; etc.

Generated reports may contain, possibly inter alia, textual and graphic elements.

Over time as ever more messages are presented to a SP the SP may continuously expand the depth and/or the breadth of its internal repositories and, possibly inter alia, consequently incrementally refine, improve, etc. the quality, etc. of its reporting, etc. activities.

Returning to FIG. 4 . . . under the Set 2 exchanges Mary's 408 SMS/MMS/etc. message 428 may be directed to an appropriate destination address (e.g., a TN or a SC), as provided/specified/identified/etc. by, possibly inter alia, M 406 or SP$_x$ 404 and may contain any number of elements or data items including, possibly inter alia, the dollar amount of the purchase, an optional account identifier (e.g., if, perhaps for convenience and/or flexibility, Mary 408 maintains more than one account), an optional MS password or identifier/code, the current date and time, etc.

It is important to note the Set 2 exchanges that are illustrated in FIG. 4 and which were described above are illustrative only and it will be readily apparent to one of ordinary skill in the relevant art that numerous other exchanges are easily possible and indeed are fully within the scope of the present invention. For example:

A) Extracting from a received message, and optionally validating/etc., various data elements including, inter alia, the Source Address (SA, such as, for example, the TN of Mary's WD), the Destination Address (such as, for example, the destination SC), the message content or body (that might contain, as just one possible example, the transaction amount), etc.

B) Preserving various elements of the received message in a Messages database table.

The processing activities that are depicted under the designation Set 3 in FIG. 4 represent the activities that might take place as the SP's 404 AS 418 completes all of the required processing activities (including, possibly inter alia, as appropriate and as required one or more billing events via SP's 404 BI 416) to, possibly among other things, generate an Authorization Code (AuC) (see 438→440).

It is important to note the Set 3 exchanges that were described above are illustrative only and it will be readily apparent to one of ordinary skill in the relevant art that numerous other exchanges are easily possible and indeed are fully within the scope of the present invention. For example:

A) A received request may be applied to or passed against one or more of a MS' accounts (for example, possibly inter alia, in a SP-defined and/or MS-defined order or sequence).

B) A received request may, for example based on SP-defined and/or MS-defined criteria (such as, possibly inter alia, occurrence frequency, individual or aggregate dollar amount, etc.), optionally trigger one or more additional check, approval, etc. steps or actions. Such steps or actions may result in, possibly inter alia, a pause in or suspension of a transaction, further approval sequences (utilizing any combination of one or more channels including, possibly inter alia, WWW, E-mail, IM, IVR, SMS/MMS/etc., phone, mail, etc.), etc.

C) A MS' account(s) may be found to contain insufficient funds to support the successful processing of a received request. Under such a circumstance a transaction may, for example, be rejected, paused, suspended, etc.; one or more notifications may be issued to a MS (utilizing any combination of one or more channels including, possibly inter alia, WWW, E-mail, IM, IVR, SMS/MMS/etc., phone, mail, etc.); etc.

In FIG. 4 the exchanges that are collected under the designation Set 4 represent the activities that might take place as SP$_x$ 404 dispatches one or more (SMS, MMS, etc.) positive response messages (see 442); the message(s) is (are) routed by a MICV 414 to Mary's 408 WC 412 (see 444); and the message(s) is (are) received by Mary 408 on her WD 410 (see 446).

The positive response message(s) may contain, possibly inter alia, an AuC value, a date/time stamp, etc. Additionally, Mary may optionally reply to a (any of the) response message(s).

It is important to note the Set 4 exchanges that were described above are illustrative only and it will be readily apparent to one of ordinary skill in the relevant art that numerous other exchanges are easily possible (e.g., one or more negative response messages might be generated and dispatched if a MS' account[s] contained insufficient funds, etc.) and indeed are fully within the scope of the present invention.

In FIG. 4 the exchanges that are collected under the designation Set 5 represent the activities that might take place as Mary 408 conveys the received AuC, along possibly with other information, to M 406 (see 448→450). The information may be conveyed to M 406 manually (e.g., verbally, through a messaging exchange, etc.) and/or automatically (e.g., via Bluetooth, via WiFi, etc.).

It is important to note the Set 5 exchanges that were described above are illustrative only and it will be readily apparent to one of ordinary skill in the relevant art that numerous other exchanges are easily possible (e.g., in an M-Commerce environment information may be conveyed through, possibly inter alia, cookies, URLs, etc.) and indeed are fully within the scope of the present invention.

In FIG. 4 the exchanges that are collected under the designation Set 6 represent the activities that might take place as M 406 optionally interacts with various back-end systems. Possibly inter alia M 406 may submit a request (containing, possibly among other things, an AuC value, the dollar amount of a purchase, a date/time stamp, a merchant identifier, a merchant password or code, etc.) (see 452); the MBS 420 may complete all of the required processing activities (including, possibly inter alia, as appropriate and as required interacting with a SP's AS) to, possibly among other things, generate an Approval Code (ApC) (see 454→456); and the MBS 420 may return a response to M 406 (containing, possibly among other things, an ApC) (see 458).

It is important to note the Set 6 exchanges that were described above are illustrative only and it will be readily apparent to one of ordinary skill in the relevant art that numerous other exchanges are easily possible and indeed are fully within the scope of the present invention.

In FIG. 4 the exchanges that are collected under the designation Set 7 represent the activities that might take place as M 406 conveys, possibly inter alia, the ApC to Mary 408 (see 460). The information may be conveyed to Mary 408 manually (e.g., verbally, through a messaging exchange, etc.) and/or automatically (e.g., via Bluetooth, via WiFi, etc.).

It is important to note the Set 7 exchanges that were described above are illustrative only and it will be readily apparent to one of ordinary skill in the relevant art that numerous other exchanges are easily possible (e.g., in an M-Commerce environment information may be conveyed through, possibly inter alia, cookies, URLs, etc.) and indeed are fully within the scope of the present invention.

It is important to note the exchanges that were described above (as residing under the designation Set 1→Set 7 in FIG. 4) are illustrative only and it will be readily apparent to one of ordinary skill in the relevant art that numerous other exchanges are easily possible and indeed are fully within the scope of the present invention.

The simple scenario that was described above (i.e., Mary completes a registration process, subsequently enters a store, completes her shopping, enters a checkout lane where her purchases are rung, and employs aspects of the present invention for payment) is illustrative only and it will be readily apparent to one of ordinary skill in the relevant art that numerous other arrangements are easily possible and indeed are fully within the scope of the present invention. For example:

1) A MS may optionally dispatch to a SP one or more additional (SMS, MMS, etc.) messages containing, possibly inter alia, an ApC value to 'close the loop' as a further security check.

2) A SP may optionally leverage Location-Based Service (LBS)/Global Positioning System (GPS) facilities to provide an additional level of security by, possibly inter alia, matching the physical location of a MS (as determined through LBS, GPS, or similar facilities) and the physical location of M.

3) A M may optionally allow a MS to bypass a conventional checkout process and might, possibly inter alia, leverage the capabilities of facilities like Near Field Communication (NFC), RFID, etc. to quickly 'scan' all of a MS' items and subsequently automatically launch the initial exchanges that are illustrated in FIG. 4.

4) Various of the information that is conveyed between a MS and a M may be exchanged via one or more of any number of mechanisms including, for example, NFC.

5) A SP may optionally alert a MS to a 'low account balance' condition (e.g., when the balance of an account drops below a threshold level previously specified by the MS, etc.). A SP may optionally allow a MS to 'top up' an account (with, possibly inter alia, cash, a credit card, a debit card, etc.) through, possibly inter alia, an appropriate exchange of (SMS, MMS, etc.) request/approval/confirmation/etc. messages.

6) A SP may optionally offer various data mining services to, possibly inter alia, Ms, MSs, WCs, etc. Such services might include, for example, transaction trends or patterns, historical summaries, etc.; may include numerous aggregations (e.g., by MS, by geographic region, by time interval, etc.); and may be presented through any combination of one or more channels including, inter alia, WWW, E-mail, IM, SMS/MMS/etc., mail, etc.

A SP may optionally offer periodic reports (on a scheduled basis, on demand, etc.) that summarize account activity—e.g., possibly inter alia, funding events, purchase transactions, payments, etc. Such reports may be delivered through any combination of one or more channels including, inter alia, WWW, E-mail, IM, IVR, SMS/MMS/etc., phone, mail, etc. and may offer various optional enhancements (such as, possibly inter alia, drill-down capability).

8) For Ms and/or MSs that so elect various of the exchanges that are illustrated in FIG. 4 (e.g., Set 1, Set 2, Set 5, etc.) may optionally be completed automatically, perhaps for an incremental fee or charge to a M and/or a MS, with an appropriate set of confirmation, approval, etc. (SMS/MMS/etc., IM, E-Mail, IVR, mail, etc.) messages.

The catalog of processing steps that were described above are illustrative only and it will be readily apparent to one of ordinary skill in the relevant art that numerous other processing steps are easily possible and indeed are fully within the scope of the present invention.

The various confirmation, response, approval, report, etc. message(s) that were described above may optionally contain an informational element—e.g., a service announcement, a relevant or applicable factoid, etc. The informational element may be selected statically (e.g., all generated messages are injected with the same informational text), selected randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a LBS/GPS facility).

A SP may optionally allow advertisers to register and/or provide (e.g., directly, or through links/references to external sources) advertising content.

The provided advertising content may optionally be included in various of the above described message(s)—e.g., textual material, multimedia (images of brand logos, sound, video snippets, etc.) material, etc. The advertising material may be selected statically (e.g., all generated messages are injected with the same advertising material), selected randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS/GPS facility).

The above described message(s) may optionally contain promotional materials, coupons, etc. (via, possibly inter alia, text, still images, video clips, etc.).

It is important to note that while aspects of the discussion that was presented above focused on the use of SCs and TNs it will be readily apparent to one of ordinary skill in the relevant art that other message address identifiers are equally applicable and, indeed, are fully within the scope of the present invention.

The discussion that was just presented referenced the specific wireless messaging paradigms SMS and MMS. However, it is to be understood that it would be readily apparent to one of ordinary skill in the relevant art that other messaging paradigms (IMS, WAP, E-mail, etc.) are fully within the scope of the present invention.

It is important to note that the hypothetical example that was presented above, which was described in the narrative and which was illustrated in the accompanying figures, is exemplary only. It is not intended to be exhaustive or to limit the invention to the specific forms disclosed. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
| --- | --- |
| ApC | Approval Code |
| API | Application Programming Interface |
| AS | Application Server |
| AuC | Authorization Code |
| BI | Billing Interface |
| CSC | Common Short Code |
| DB | Database |
| DBMS | Database Management System |
| E-mail | Electronic Mail |
| GIS | Geographic Information System |
| GPS | Global Positioning System |
| GW | Gateway |
| IM | Instant Messaging |
| IMS | IP Multimedia Subsystem |
| IP | Internet Protocol |
| IQ | Incoming Queue |
| IVR | Interactive Voice Response |
| LBS | Location Based Services |
| M | Merchant |
| MBS | Merchant Back-end System |
| MICV | Messaging Inter-Carrier Vendor |
| MMS | Multimedia Message Service |
| MS | Mobile Subscriber |
| NFC | Near Field Communication |
| ODBMS | Object Database Management System |
| OQ | Outgoing Queue |
| PC | Personal Computer |
| PoS | Point of Sale |
| RDBMS | Relational Database Management System |
| RFID | Radio Frequency Identification |
| SA | Source Address |
| SC | Short Code |
| SMS | Short Message Service |

-continued

| Acronym | Meaning |
| --- | --- |
| SP | Service Provider |
| TN | Telephone Number |
| URL | Uniform Resource Locator |
| WAP | Wireless Application Protocol |
| WC | Wireless Carrier |
| WD | Wireless Device |
| WS | Web Server |
| WWW | World-Wide Web |

What is claimed is:

1. A method for enhancing the security of a transaction payment, comprising:

receiving, at a service provider, a request message from a mobile subscriber, said request message being associated with a payment portion of a transaction and including a payment amount;

extracting from the request message at least the amount of the transaction;

performing one or more processing steps using, at least in part, the amount of the transaction and a user profile comprising information previously supplied by the mobile subscriber and yielding, at least in part, an authorization code;

augmenting the user profile with data about the mobile subscriber supplied from at least one source other than the mobile subscriber;

generating a response message containing, at least in part, the authorization code and an advertisement responsive to the augmented user profile;

dispatching to said mobile subscriber said response message, wherein prior to yielding the authorization code, triggering, based on criteria defined by the Mobile Subscriber, a further approval sequence for the transaction, and wherein the criteria are received at the service provider from the mobile subscriber during a prior registration process with the service provider, and wherein the criteria include an aggregate dollar amount that is compared to a cumulative dollar amount resulting from multiple occurrences of received request messages each having a respective payment amount.

2. The method of claim 1, wherein the request message is any of (a) a Short Message Service message, (b) a Multimedia Message service message, or (c) an IP Multimedia Subsystem message.

3. The method of claim 1, wherein the request message further includes one or more of (a) an account identifiers and/or (b) a password.

4. The method of claim 1, wherein the processing steps include one or more of (a) one or more inquiries to the mobile subscriber, (b) a low or an empty balance replenishment operation, and/or (c) mobile subscriber location awareness.

5. The method of claim 4, wherein the mobile subscriber location awareness is derived from one or more of (a) Location-Based Services and/or (b) Global Positioning System services.

6. The method of claim 1, wherein the response message is one of (a) a Short Message Service message, (b) a Multimedia Message Service message, or (c) an IP Multimedia Subsystem message.

7. The method of claim 1, wherein said information is defined by a mobile subscriber during a registration process.

8. The method of claim 7, wherein said information includes one or more of Identifying Information, Contact Information, Billing Information, and Account Information.

9. The method of claim 7, wherein said registration process is web-based.

10. The method of claim 7, wherein said registration process includes a billing component.

11. The method of claim 1, further comprising:
said mobile subscriber supplying said authorization code to a merchant.

12. The method of claim 11, wherein the authorization code is supplied via one or more of (a) manual means, (b) Bluetooth, (c) WiFi, (d) Near Field Communication, (e) Uniform Resource Locator, and/or (f) Web cookie.

13. The method of claim 11, further comprising:
completing one or more processing steps to generate an approval code;
generating a response message containing, at least in part, the approval code; and
dispatching said response message with said approval code to said merchant.

14. The method of claim 13, further comprising:
said merchant supplying said approval code to said mobile subscriber.

15. The method of claim 14, wherein the approval code is supplied via one or more of (a) manual means, (b) Bluetooth, (c) WiFi, (d) Near Field Communication, (e) Uniform Resource Locator, and/or (f) Web cookie.

16. A method of conducting a commercial transaction, comprising:
receiving, at a service provider associated with a short code, a single, mobile subscriber-initiated, short message service (SMS) message, addressed to the short code, the SMS message including a payment amount for a commercial transaction;
retrieving, from a user profile, information received in a prior registration process, the information including criteria defined by the Mobile Subscriber for triggering a further approval sequence;
augmenting the user profile with data about the mobile subscriber supplied from at least one source other than the mobile subscriber;
communicating with a billing interface to obtain an authorization code for the payment amount;
sending a response SMS message to the mobile subscriber, the response SMS message including the authorization code and an advertisement responsive to the augmented user profile, wherein prior to sending the authorization code, triggering, based on the criteria defined by the Mobile Subscriber, the further approval sequence for the commercial transaction, wherein the criteria include an aggregate dollar amount that is compared to a cumulative dollar amount resulting from multiple occurrences of received request messages each having a respective payment amount;
receiving the authorization code from a party to the commercial transaction other than the mobile subscriber, and generating an approval code based on the authorization code, payment amount and at least one identifier; and
supplying the approval code to the party to the commercial transaction other than the mobile subscriber.

17. The method of claim 16, further comprising receiving from the mobile subscriber a SMS message including the approval code.

18. The method of claim 17, further comprising confirming that the mobile subscriber is in a same location as the party to the commercial transaction other than the mobile subscriber.

19. The method of claim 18, wherein the step of confirming comprises employing location-based services or global positioning system (GPS) services.

20. A method for enhancing the security of a transaction payment, comprising:
receiving, at a service provider, a request message from a mobile subscriber, said request message being associated with a payment portion of a transaction and including a payment amount;
extracting from the request message at least the amount of the transaction;
performing one or more processing steps using, at least in part, the amount of the transaction and information previously supplied by the mobile subscriber and yielding, at least in part, an authorization code;
generating a first response message containing, at least in part, the authorization code and an advertisement responsive to an augmented user profile;
dispatching to said mobile subscriber said first response message;
supplying the authorization code from the mobile subscriber to a merchant;
completing one or more additional processing steps to generate an approval code;
generating a second response message containing, at least in part, the approval code;
dispatching the second response message with the approval code to the merchant;
supplying the approval code from the merchant to the mobile subscriber; and
receiving, at the service provider, a confirmation message from the mobile subscriber, the confirmation message comprising the approval code,
wherein prior to yielding the authorization code, triggering, based on criteria defined by the Mobile Subscriber, a further approval sequence for the transaction,
wherein the criteria are received at the service provider from the mobile subscriber during a prior registration process with the service provider, and wherein the criteria include an aggregate dollar amount that is compared to a cumulative dollar amount resulting from multiple occurrences of received request messages each having a respective payment amount.

* * * * *